June 15, 1965 P. A. VAN BERKUM 3,189,783

SWITCHING ARRANGEMENT FOR FAST ON-OFF SWITCHING OF HIGH AMPLITUDE CURRENT

Filed March 25, 1963 2 Sheets-Sheet 1

INVENTOR.
Petrus A. van Berkum
BY James E. Tracy
Atty.

INVENTOR.
Petrus A. van Berkum
BY James E. Tracy
Atty.

United States Patent Office 3,189,783
Patented June 15, 1965

3,189,783

SWITCHING ARRANGEMENT FOR FAST ON-OFF SWITCHING OF HIGH AMPLITUDE CURRENT

Petrus A. van Berkum, Elmhurst, Ill., assignor to Zenith Radio Corporation, a corporation of Delaware Filed Mar. 25, 1963, Ser. No. 267,544
10 Claims. (Cl. 315—27)

Figure 1:
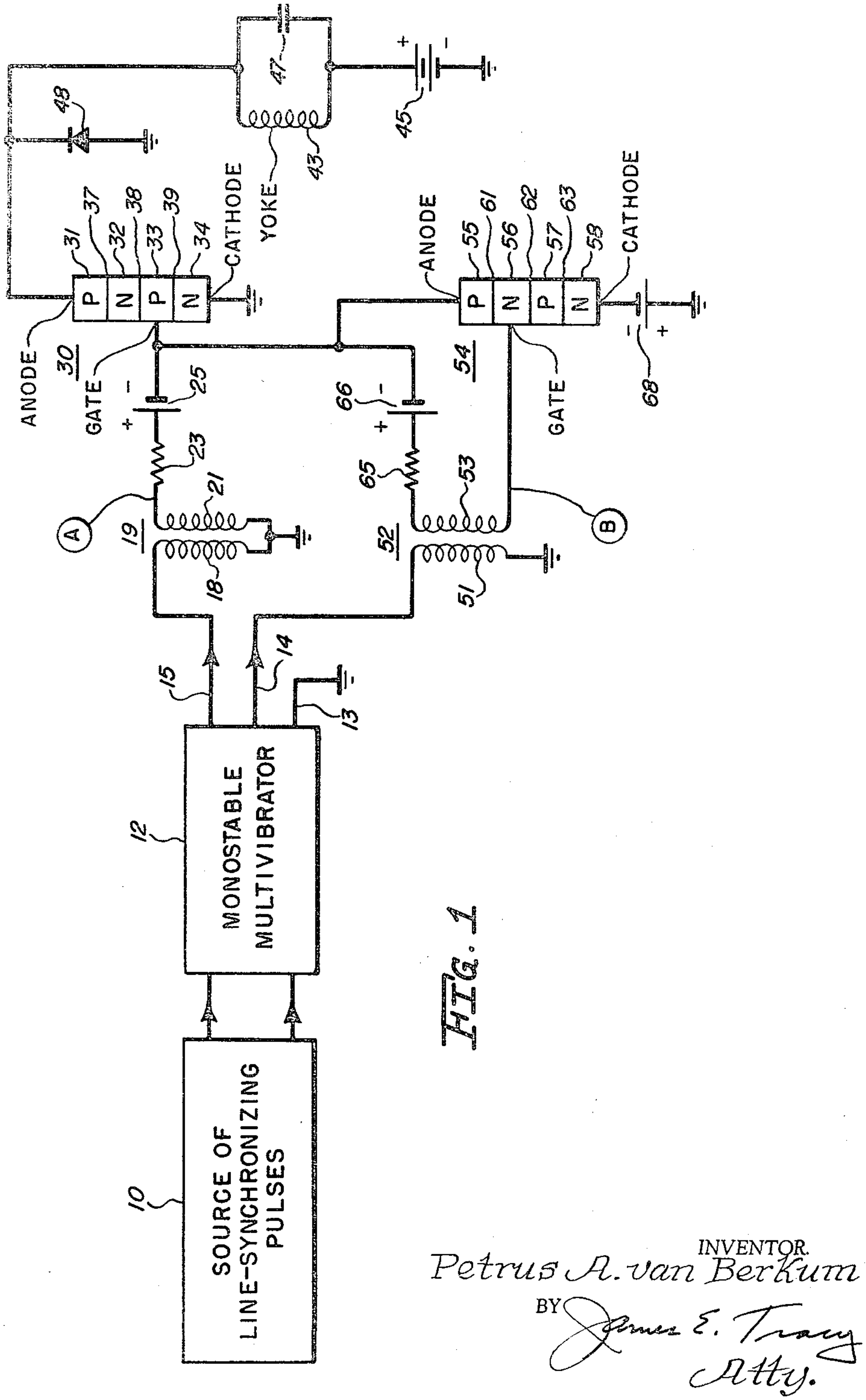

This invention pertains in general to a new and improved switching arrangement, and particularly to a semiconductor switching arrangement for controlling the current supply to a load. The novel switching arrangement may be employed in many different environments in which high amplitude current flow to a load is to be switched rapidly on and off in a controlled fashion. For convenience, the present application illustrates the invention as it may be incorporated in a scanning system for alternately connecting and disconnecting a voltage source to an inductive deflection yoke, normally employed to achieve horizontal sweeping in the picture tube of a conventional television receiver, to produce current of sawtooth waveform in the yoke.

Relatively fast switching on and off of high amplitude current flow to a load by means of semiconductor switching devices presents a substantial problem because of the power requirements, especially when it is desired to operate the switching arrangement from a battery voltage source as would be the case when the switching arrangement is embodied in the horizontal sweep system of a completely portable television receiver. As is well recognized, the horizontal sweep system ordinarily accounts for a major portion of the total power consumed in a television set. The present invention solves this problem and provides a switching arrangement requiring relatively little power considering the results achieved.

Aside from the minimum power requirements, the switching scheme of the present invention achieves faster switching (turn-off and turn-on) of current to a load than previous arrangements. Moreover, these results are realized by means of semiconductor devices of more rugged, and yet less expensive, construction than most other semiconductor devices used heretofore.

Accordingly, it is an object of the present invention to provide a new and improved switching arrangement for controlling the current supply to a load.

It is another object of the invention to provide a semiconductor horizontal scanning generator for producing a sawtooth current waveform in a magnetic deflection yoke suitable for sweeping the picture tube of a battery operated portable television receiver.

A switching arrangement, constructed in accordance with one aspect of the present invention, comprises a first switching device having first, second and control terminals and of the type which is initially rendered conductive to translate current between its first and its second terminals in response to the translation of triggering current in a predetermined direction between its control terminal and its first terminal, which remains conductive subsequent to the termination of the triggering current, and which is thereafter rendered nonconductive in response to reversing the current flow between its control terminal and its first terminal. An output load is coupled to the first and second terminals of the first switching device. There are means for translating triggering current in the predetermined direction between the control terminal and the first terminal to render the first device conductive and to effect current flow between the first and second terminals and through the output load. A second switching device is provided which has first, second and control terminals. There are means coupling the first and second terminals of the second device to the control and the first terminals of the first device. There are also means coupled to the control terminal of the second device for rendering the second device conductive, subsequent to the termination of the triggering current translated between the first terminal and the control terminal of the first device, to effect current flow between the control and the first terminals of the first device in a direction opposite to the predetermined direction to render the first device nonconductive and to effect termination of current flow through the load.

A switching arrangement, according to another aspect of the invention, comprises a first semiconductor switching device including four layers of alternate conductivity type semiconductor material forming three different PN junctions. There is a series circuit including an output load and all three of the junctions of the first switching device. Means are provided for forward biasing one of the junctions of the first switching device to effect current flow in a predetermined direction through the series circuit. There is a second semiconductor switching device including at least three layers of alternate conductivity type semiconductor material forming two different PN junctions. Means are provided which couple both of the junctions of the second switching device in series with the aforementioned one junction of the first device. Finally, the switching arrangement comprises means for forward biasing a junction of the second switching device to effect current flow through the aforementioned one junction of the first switching device in the direction opposite to the predetermined direction to reverse bias the one junction and effect termination of current flow through the load.

Figure 2:
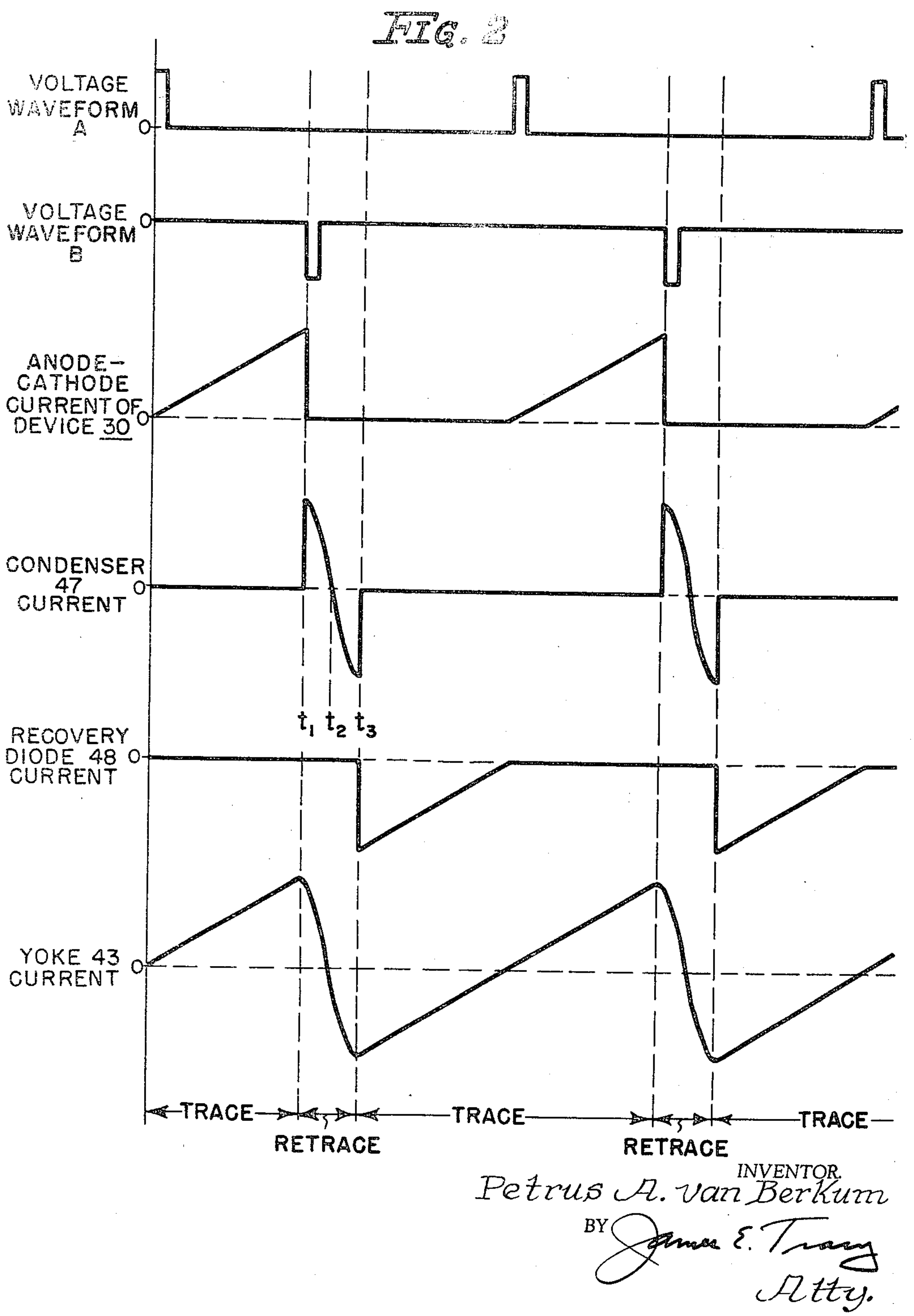

The features of this invention which are believed to be new are set forth with particularity in the appended claims. The invention, together with further objects and advantages thereof, may best be understood, however, by reference to the following description in conjunction with the accompanying drawings, in which:

FIGURE 1 is a schematic diagram of a horizontal sweep system for a television receiver including a switching arrangement constructed in accordance with the invention;

FIGURE 2 comprises signal waveforms helpful in explaining the operation of the sweep system of FIGURE 1.

Turning now to a structural description of FIGURE 1, a source 10 of line-synchronizing pulses, such as a synchronizing signal separator or an automatic frequency controlled oscillator of a television receiver, has its output terminals connected to a conventional monostable or single trip multivibrator 12 to effect actuation thereof. The parameters of the multivibrator are so chosen, in a manner known in the art, that once it is actuated from its normal to its abnormal condition by means of a line-synchronizing pulse from source 10, it will remain in that abnormal condition for an interval approximately equal to one-half the horizontal trace interval, at which time it will automatically return to its normal condition. Unit 12 is provided with three output terminals 13, 14 and 15, terminal 13 of which is connected to a plane of reference potential, such as ground, while terminals 14 and 15 are connected to appropriate points in the multivibrator circuit to produce relatively narrow voltage pulses at the instants when the multivibrator triggers from one condition to the other. Specifically, output terminal 15 is so connected that it produces a pulse each time multivibrator 12 is switched from its normal to its abnormal condition, while output terminal 14 is so connected that it produces a pulse each time the multivibrator triggers from its abnormal condition back to its normal or reference condition. Monostable multivibrator circuits delivering output trigger pulses in this manner are well known in the art.

Output terminal 15 is connected to one terminal of the primary winding 18 of a transformer 19, the other terminal of which is connected to ground. One terminal of secondary winding 21 of transformer 19 is connected to ground while the other terminal is coupled through a resistor 23 to the positive terminal of a bias potential source 25, the negative terminal of which is connected to the control or gate terminal of a semi-conductor switching device 30. In addition to the control terminal, device 30 has a first or cathode terminal and a second or anode terminal. The device is composed of four layers 31, 32, 33, 34 of alternate conductivity type semiconductor material forming three different PN junctions 37, 38, and 39. Zones 31 and 33 are of P conductivity type while zones 32 and 34 are of N type. The gate terminal is connected to P layer 33. Four-layer device 30 may be a solid state thyratron, a silicon controlled rectifier, a silicon gate controlled switch, or the like.

With a reverse bias applied to device 30, such as by applying a negative potential to the gate terminal with respect to the cathode to reverse bias junction 39, anode-cathode current flow is blocked until the avalanche voltage is reached. If a positive potential is then impressed on the gate, junction 39 becomes forward biased and device 30 assumes a high conduction state. In this condition, the current flow is limited only by the external circuit impedance and the supply voltage. By employing the gate terminal to turn on the four-layer switching device, control of relatively high amplitude anode-cathode current is achieved by a relatively low power signal source.

More specifically, device 30 may be initially rendered conductive to translate current between its first or cathode terminal and its second or anode terminal in response to the translation of triggering current in a predetermined direction between its control or gate terminal and its first or cathode terminal, namely in the direction from the control to the first terminals in the illustrated embodiment. Once device 30 has been rendered conductive, it remains conductive even subsequent to the termination of the triggering current. It may thereafter be rendered nonconductive in response to reversing the current flow between its control terminal and its first or cathode terminal.

Device 30 exhibits all of the inherent advantages of a solid state device, including long life, large power handling capability, and ruggedness under severe conditions. Both the "turn on" and "turn off" times are extremely fast.

The cathode of four-layer semiconductor switching device 30 is connected to ground and the anode or second terminal is connected through an output load, in the form of a substantially inductive magnetic deflection yoke 43, to the positive terminal of a source of unidirectional operating potential 45, the negative terminal being grounded. With this arrangement, a series circuit is provided which includes output load 43 and all three junctions 37, 38, and 39 of switching device 30. Yoke 43 is shunted by a condenser 47, and a recovery or damper diode 48 is coupled between the anode of device 30 and ground. Specifically, the cathode terminal of diode 48 is directly connected to the anode of device 30 while the anode of the recovery diode is grounded.

Output terminal 14 of multivibrator 12 is connected to one side of the primary winding 51 of a transformer 52, the other side of the primary being grounded. One terminal of the secondary winding 53 of transformer 52 is connected to the gate or control terminal of another semiconductor switching device 54 which may be of the same construction as device 30. In other words, in addition to the control terminal, device 54 has a first or cathode terminal and a second or anode terminal. There are four layers 55, 56, 57, 58 of alternate conductivity type semiconductor material forming three different PN junctions 61, 62, 63. Layers or zones 55 and 57 are of P conductivity type while zones 56 and 58 are of the N conductivity variety. Unlike device 30, the gate terminal is connected to N layer 56.

The other terminal of secondary winding 53 is coupled through a resistor 65 to the positive terminal of a bias potential source 66, and the negative terminal of the bias source is connected to the anode or second terminal of switching device 54, which anode is also connected to the gate of switching device 30. The first terminal of device 54 is connected to the negative terminal of a source of unidirectional operating potential 68, the positive terminal of which is grounded. With this arrangement, a series circuit is provided which includes junction 39 of device 30 and all three junctions 61, 62 and 63 of device 54. Of course, when switching device 30 is established in its conductive state current flows through the device in the direction from its anode to its cathode. Similarly, when device 54 is triggered to its conductive condition, current flows from anode to cathode.

In describing the operation of the scanning generator of FIGURE 1, reference is also made to the idealized signal waveforms of FIGURE 2 which appear at various points in the circuit of FIGURE 1. Bias source 25 impresses a negative voltage on P layer 33 by way of the gate terminal in order to normally reverse bias junction 39 to establish switching device 30 in its nonconductive condition. At the same time, bias source 66 establishes N zone 56 at a positive potential with respect to layer 55 thereby to reverse bias junction 61 to establish switching device 54 normally in its non-conductive condition.

Meanwhile, source 10 produces periodically recurring line-synchronizing pulses, each of which actuates monostable multivibrator 12 from its reference to its abnormal operating condition. In response to each such actuation, a voltage pulse is produced on output terminal 15 which in turn is transformed to the secondary winding 21 of transformer 19. The transformer is so wound that the pulses produced on output terminal 15 manifest at the ungrounded terminal of secondary winding 21 as positive polarity pulses as shown by voltage waveform A in FIGURE 2. As mentioned previously, each actuation of single-trip multivibrator 12 to its abnormal condition, in response to a line synchronizing pulse from source 10, is followed approximately one-half of a horizontal trace interval later by automatic triggering of the multivibrator back to its normal condition. At those instants, pulses are applied to primary winding 51 of transformer 52, the transformer being so wound that they manifest on the lower terminal of secondary 53 (namely, the terminal which is connected to the gate of device 54) as negative polarity pulses, with respect to the upper terminal, as shown by voltage waveform B.

The positive pulses of waveform A are applied to the control terminal of switching device 30 and are of an amplitude sufficient to overcome the reverse bias provided by source 25 to cause forward biasing of junction 39. Device 30 therefore assumes its conductive condition in which current flows in the direction from the positive terminal of potential source 45 through output load 43 and all three junctions of device 30 to ground. As is characteristic of four-layer, three-junction semiconductor switching devices, once the device is turned on by a gating pulse, it will continue conducting indefinitely subsequent to the termination of the pulse. In other words, bias source 25 is unable to turn device 30 off upon the termination of each positive pulse of waveform A.

Because of the inductive nature of load 43, when device 30 is in its conductive state the amplitude of the current flowing through the load increases in substantially linear sawtooth fashion. Hence, the waveform of the anode-cathode current flowing through the three junctions of switching device 30, while the device is on, is as shown in FIGURE 2. The anode-cathode current of device 30 rises in linear fashion from zero, starting at the instant device 30 is rendered conductive by a positive pulse of waveform A, because of the presence of inductive yoke 43 which is in series with device 30 at the time. Recovery diode 48 may be ignored while device 30 is conductive inasmuch as potential source 45 establishes the cathode of diode 48 positive with respect to its anode, thereby rendering the diode cut off.

Device 30 remains conductive and its anode-cathode current continues to increase linearly until the instant at which the immediately succeeding negative pulse of voltage waveform B occurs. That pulse, which is applied to N layer 56 by way of the gate terminal of device 54, is of sufficient magnitude to overcome the normal reverse bias impressed on junction 61 by bias source 66 in order to forward bias that junction and establish switching device 54 in its conductive condition. At that time a relatively large magnitude of current flows in the series circuit including junctions 39, 61, 62 and 63 and potential source 68 in the direction from anode to cathode of device 54 and from the cathode to the gate of device 30. As a consequence, the current supplied by potential source 68 flows through junction 39 in the direction opposite to the direction of the current flow through device 30 caused by potential source 45. While device 54 is on, it presents a very low impedance between its anode and cathode and thus by establishing potential source 68 at an appropriate magnitude, the reverse current flowing through junction 39 may be made sufficient to reverse bias that junction, thereby to establish device 30 in its nonconductive condition. Hence, at the instant of each negative pulse of waveform B, the linearly increasing current flow through device 30 is abruptly terminated as shown by the anode-cathode current waveform in FIGURE 2.

As is conventional in most horizontal sweep systems, at the instant the switching device supplying current to the yoke opens (which instant defines the conclusion of each trace interval), the yoke current ceases to increase and the magnetic field which builds up in the yoke during the interval of rising current tends to collapse, resulting in the flow of current into the shunting condenser 47. This is shown by the current waveform for condenser 47 in FIGURE 2 during the first half of each retrace interval embraced by the indicia $t_1$–$t_2$. During the second half of each retrace interval, namely in the period defined by indicia $t_2$–$t_3$, current flows out of the condenser and into yoke 43. At time $t_3$, the energy stored in the yoke produces linearly decreasing current, enduring for approximately one-half of the trace interval, through the loop including yoke 43, recovery or damper diode 48 and potential source 45, as shown by the recovery diode current waveform in FIGURE 2.

As shown by the anode-cathode current waveform of device 30, current flows from the positive terminal of potential source 45 and through the yoke in one direction during the second half of each trace interval, while the energy remaining at the end of retrace in the yoke effects current flow through the yoke in the opposite direction during the first half of each trace interval, as evidenced by the diode 48 current waveform. The yoke current is also shown in FIGURE 2. During trace it is a combination of that flowing through switching device 30 and damper diode 48. The yoke current during retrace is sinusoidal as shown, being the same current which flows through condenser 47.

The novel switching arrangement of the present application contains an automatic turn-off feature for switching device 54. When junction 39 becomes reverse biased by means of the anode-cathode current flowing through device 54, the series circuit for device 54 opens (at junction 39), thereby effectively removing potential source 68. In other words, device 54 initiates the interruption of its own power supply, causing it to turn off.

While, in the illustrated embodiment, device 54 is of the four-layer, three-junction variety, this is not necessary to practice the present invention. For example, device 54 may take the form of a conventional three-layer, two-junction semiconductor transistor in which the transistor is turned on by applying pulses to its base, the emitter-collector conduction path being in series with junction 39.

It should be apparent that the present switching arrangement is capable of switching relatively high amplitude current flow through yoke 43, which is necessary to sweep present day picture tubes, by means of relatively little driving power. The amount of energy on the part of the pulses of waveform A to turn device 30 on and on the part of the waveform B to turn device 54 on is relatively insignificant compared to previously developed semiconductor switching arrangements suitable for use in horizontal scanning generators. In addition, because of the relatively high magnitude of current that may be translated through device 54, device 30 may be switched off very rapidly compared to previous switching arrangements. Also, the turn-off characteristics (for example the purity) of device 30 may be made to much wider tolerances because of the large turn-off current available through switching device 54. As a consequence, devices 30 and 54 may be manufactured rather inexpensively.

To summarize, the present application discloses a switching arrangement comprising a first switching device 30 having first, second and control terminals (cathode, anode and gate terminals, respectively) and is of the type which is initially rendered conductive to translate current between its first and its second terminals in response to the translation of triggering current in a predetermined direction between its control or gate terminal and its first or cathode terminal (namely, from gate to cathode), and which is subsequently rendered nonconductive in response to reversing the current flow between its control terminal and its first terminal. An output load 43 is coupled to the first and second terminals of first switching device 30. The trigger circuitry coupled to the gate terminal of device 30 provides means for translating triggering current between the first or cathode terminal and the control or gate terminal of switching device 30 in the predetermined direction (from gate to cathode) to effect current flow through load 43.

A second switching device 54 has first, second and control terminals (cathode, anode and gate terminals, respectively) and is of the type which is rendered conductive to translate current between its first and its second terminals in response to a control effect applied to its control or gate terminal, namely in response to the translation of triggering current betwen its gate terminal and a given selected one of its first and second terminals, the anode in the illustrated embodiment. The circuitry coupling device 54 with device 30 constitutes means coupling the first and second terminals of second device 54 to the control and first terminals of first device 30. The circuitry coupled to the gate terminal of device 54 provides means for applying a control effect to the control or gate terminal of second device 54 to render the second device conductive and to effect current flow between the control and the first terminals of first device 30 in a direction opposite to the predetermined direction, thereby to render the first device nonconductive and effect termination of current flow through load 43.

Viewed from a different aspect, the present application discloses a switching arrangement comprising a first semiconductor switching device 30 including four layers 31, 32, 33, 34 of alternate conductivity type semiconductor material forming three different PN junctions 37, 38, 39. There is a series circuit including an output load 43 and all three of junctions 37, 38, 39. The trigger circuitry coupled to the gate terminal of device 30 provides means for forward biasing one of the junctions of switching device 30 (specifically junction 39) to effect current flow in a predetermined direction through the series circuit. Specifically, current flows in the direction from the anode to the cathode of device 30.

A second semiconductor switching device 54 includes four layers 55, 56, 57, 58 of alternate conductivity type semiconductor material forming three different PN junctions 61, 62, 63. The circuitry coupling device 54 with junction 39 constitutes means coupling all three of the junctions of switching device 54 in series with junction 39 of device 30. The circuit coupled between the gate and anode of device 54 provides means for forward biasing a junction of switching device 54 (specifically junction 61)

to effect current flow through junction 39 of switching device 30 in the direction opposite to the predetermined direction to reverse bias junction 39 and effect termination of current flow through load 43.

While particular embodiments of the invention have been shown and described, modifications may be made and it is intended in the appended claims to cover all such modifications as may fall within the true spirit and scope of the invention.

I claim:

1. A switching arrangement comprising:

a first switching device having first, second and control terminals and of the type which is initially rendered conductive to translate current between its first and its second terminals in response to the translation of triggering current in a predetermined direction between its control terminal and its first terminal, which remains conductive subsequent to the termination of the triggering current, and which is thereafter rendered nonconductive in response to reversing the current flow betwen its control terminal and its first terminal;

an output load coupled to said first and second terminals of said first switching device;

means for translating triggering current in said predetermined direction between said control terminal and said first terminal of said first switching device to render said first device conductive and to effect current flow between said first and said second terminals and through said output load;

a second switching device having first, second and control terminals;

means coupling said first and second terminals of said second device to said control and said first terminals of said first device;

and means coupled to said control terminal of said second device for rendering said second device conductive, subsequent to the termination of the triggering current translated between said first terminal and said control terminal of said first device, to effect current flow between said control and said first terminals of said first device in a direction opposite to said predetermined direction to render said first device nonconductive and to effect termination of current flow through said load.

2. A switching arrangement comprising:

a first semiconductor switching device having first, second and control terminals and of the type which is initially rendered conductive to translate current between its first and its second terminals in response to the translation of triggering current in a predetermined direction between its control terminal and its first terminal, which remains conductive subsequent to the termination of the triggering current, and which is thereafter rendered nonconductive in response to reversing the current flow between its control terminal and its first terminal;

an output load coupled to said first and second terminals of said first switching device;

means for translating triggering current in said predetermined direction between said control terminal and said first terminal of said first switching device to render said first device conductive and to effect current flow between said first and said second terminals and through said output load;

a second semiconductor switching device having first, second and control terminals;

means coupling said first and second terminals of said second device to said control and said first terminals of said first device;

and means coupled to said control terminal of said second device for rendering said second device conductive, subsequent to the termination of the triggering current translated between said first terminal and said control terminal of said first device, to effect current flow between said control and said first terminals of said first device in a direction opposite to said predetermined direction to render said first device nonconductive and to effect termination of current flow through said load.

3. A switching arrangement comprising:

a first switching device having first, second and control terminals and of the type which is initially rendered conductive to translate current between its first and its second terminals in response to the translation of triggering current in a predetermined direction between its control terminal and its first terminal, which remains conductive subsequent to the termination of the triggering current, and which is thereafter rendered nonconductive in response to reversing the current flow between its control terminal and its first terminal;

an output load coupled to said first and second terminals of said first switching device;

means for translating triggering current between said first terminal and said control terminal of said first device in said predetermined direction to effect current flow through said load;

a second switching device having first, second and control terminals and of the type which is rendered conductive to translate current between its first and its second terminals in response to a control effect applied to its control terminal;

means coupling said first and second terminals of said second device to said control and said first terminals of said first device;

and means for applying a control effect, subsequent to the termination of the triggering current translated between said first terminal and said control terminal of said first device, to said control terminal of said second device to render said second device conductive and to effect current flow between said control and said first terminals of said first device in a direction opposite to said predetermined direction, thereby to render said first device nonconductive and effect termination of current flow through said load.

4. A switching arrangement comprising:

a first semiconductor switching device having first, second and control terminals and of the type which is initially rendered conductive to translate current between its first and its second terminals in response to the translation of triggering current in a predetermined direction between its control terminal and its first terminal, which remains conductive subsequent to the termination of the triggering current, and which is thereafter rendered nonconductive in response to reversing the current flow between its control terminal and its first terminal;

an output load coupled to said first and second terminals of said first switching device;

means for translating triggering current between said first terminal and said control terminal of said first device in said predetermined direction to effect current flow through said load;

a second semiconductor switching device having first, second and control terminals and of the type which is rendered conductive to translate current between its first and its second terminals in response to the translation of triggering current between its control terminal and a given one of its first and second terminals;

means coupling said first and second terminals of said second device to said control and said first terminals of said first device;

and means for translating triggering current, subsequent to the termination of the triggering current translated between said first terminal and said control terminal of said first device, between said given terminal and said control terminal of said second device to render said second device conductive and to effect current flow between said control and said first terminals of said first device in a direction opposite to said predetermined direction, thereby to render said first device nonconductive and effect termination of current flow through said load.

5. A switching arrangement comprising:
a first semiconductor switching device including four layers of alternate conductivity type semiconductor material forming three different PN junctions;
a series circuit including an output load and all three of said junctions of said first switching device;
means for forward biasing one of said junctions of said first switching device to effect current flow in a predetermined direction through said series circuit;
a second semiconductor switching device including at least three layers of alternate conductivity type semiconductor material forming at least two different PN junctions;
means coupling both of said junctions of said second switching device in series with said one junction of said first device;
and means for forward biasing a junction of said second switching device to effect current flow through said one junction of said first switching device in the direction opposite to said predetermined direction to reverse bias said one junction and effect termination of current flow through said load.

6. A switching arrangement comprising:
a first semiconductor switching device including four layers of alternate conductivity type semiconductor material forming three different PN junctions;
a series circuit including an output load and all three of said junctions of said first switching device;
means for forward biasing one of said junctions of said first switching device to effect current flow in a predetermined direction through said series circuit;
a second semiconductor switching device including four layers of alternate conductivity type semiconductor material forming three different PN junctions;
means coupling all three of said junctions of said second switching device in series with said one junction of said first device;
and means for forward biasing a junction of said second switching device to effect current flow through said one junction of said first switching device in the direction opposite to said predetermined direction to reverse bias said one junction and effect termination of current flow through said load.

7. A scanning generator for developing in a substantially inductive magnetic deflection yoke a periodically recurring sawtooth current waveform having during each cycle a relatively long trace interval and a relatively short retrace interval, comprising:
a first semiconductor switching device including four layers of alternate conductivity type semiconductor material forming three different PN junctions;
a series circuit including said magnetic deflection yoke and all three of said junctions of said first switching device;
means for forward biasing one of said junctions of said first switching device during each trace interval to effect current flow in a predetermined direction and of sawtooth waveshape through said series circuit;
a second semiconductor switching device including four layers of alternate conductivity type semiconductor material forming three different PN junctions;
means coupling all three of said junctions of said second switching device in series with said one junction of said first device;
and means for forward biasing a junction of said second switching device at the termination of each trace interval to effect current flow through said one junction of said first switching device in the direction opposite to said predetermined direction to reverse bias said one junction and effect termination of current flow through said deflection yoke.

8. A switching arrangement comprising:
a first semiconductor switching device including four layers of alternate conductivity type semiconductor material forming three different PN junctions;
a first series circuit including an output load and all three of said junctions of said first switching device;
means for forward biasing one of said junctions of said first switching device to effect current flow in a predetermined direction through said first series circuit;
a second semiconductor switching device including four layers of alternate conductivity type semiconductor material forming three different PN junctions;
a second series circuit including all three of said junctions of said second switching device and said one junction of said first device;
and means for forward biasing a junction of said second switching device to effect current flow in a direction through said second series circuit and of a magnitude sufficient to reverse bias said one junction to cause termination of current flow through said first series circuit with a resultant opening of said second series circuit thereby to effect automatic termination of current flow through said second series circuit.

9. A switching arrangement comprising:
a first semiconductor switching device having conductive and nonconductive conditions and including four layers of alternate conductivity type semiconductor material forming three different PN junctions;
a series circuit including an output load and all three of said junctions of said first switching device;
a trigger circuit including a bias potential source normally reverse biasing one of said junctions of said first switching device to establish said first device in its nonconductive condition;
means for applying a signal to said trigger circuit of predetermined minimum amplitude and of a polarity opposing said reverse bias to forward bias said one junction to establish said first switching device in its conductive condition to effect current flow in a predetermined direction through said series circuit;
a second semiconductor switching device including four layers of alternate conductivity type semiconductor material forming three different PN junctions;
means coupling all three of said junctions of said second switching device in series with said one junction of said first device;
and means for forward biasing a junction of said second switching device to effect current flow through said one junction of said first switching device in the direction opposite to said predetermined direction to reverse bias said one junction and effect termination of current flow through said load.

10. A switching arrangement comprising:
a first semiconductor switching device having conductive and nonconductive conditions and including four layers of alternate conductivity type semiconductor material forming three different PN junctions;
a series circuit including an output load and all three of said junctions of said first switching device;
a first trigger circuit including a first bias potential source normally reverse biasing one of said junctions of said first switching device to establish said first device in its nonconductive condition;
means for applying a signal to said first trigger circuit of predetermined minimum amplitude and of a polarity opposing said reverse bias to forward bias said one junction to establish said first switching device in its conductive condition to effect current flow in a predetermined direction through said series circuit;

a second semiconductor switching device having conductive and nonconductive conditions and including four layers of alternate conductivity type semiconductor material forming three different PN junctions;

means coupling all three of said junctions of said second switching device in series with said one junction of said first device;

a second trigger circuit including a second bias potential source normally reverse biasing a predetermined junction of said second switching device to establish said second device in its nonconductive condition;

and means for applying a signal to said second trigger circuit of predetermined minimum amplitude and of a polarity sufficient to forward bias said predetermined junction to establish said second switching device in its conductive condition to effect current flow through said one junction of said first switching device in the direction opposite to said predetermined direction to reverse bias said one junction and effect termination of current flow through said load.

References Cited by the Examiner

UNITED STATES PATENTS 3,056,064 9/62 Bourget ---------------- 315—27

DAVID G. REDINBAUGH, *Primary Examiner.*